Nov. 17, 1942.  R. M. CONKLIN  2,302,528
THERMOSTATIC CONTROL FOR AIR CONDITIONING APPARATUS
Filed Feb. 12, 1941
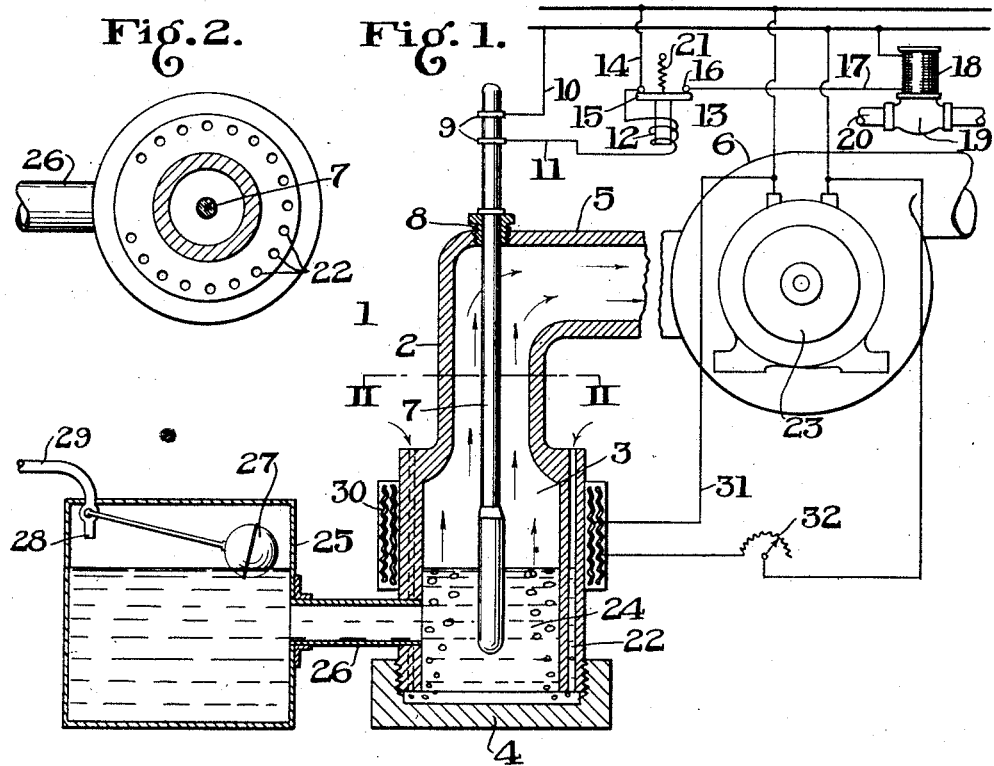
Inventor
ROBERT M. CONKLIN
By *W. S. McDowell*
Attorney Patented Nov. 17, 1942

2,302,528

UNITED STATES PATENT OFFICE 2,302,528

THERMOSTATIC CONTROL FOR AIR CONDITIONING APPARATUS

Robert M. Conklin, Columbus, Ohio, assignor to Frederic D. Pfening, Columbus, Ohio Application February 12, 1941, Serial No. 378,557

5 Claims. (Cl. 236—44)

This invention relates generally to air conditioning apparatus and in its more particular aspects is directed to an improved thermostatic control device for governing the operations of the humidity introducing means of such air conditioning apparatus.

Many air conditioning systems have been proposed and are now in general use wherein various types of control devices are employed. In such systems, thermostatic devices operated by the temperature of the air within the enclosure being serviced are utilized to control the introduction of heated or cooled air into which moisture has been injected without regard to the proper relative proportions of moisture and air most conducive to human comfort or to the intended use.

In some systems, attempts have been made to use moisture affected controls for governing the introduction of moisture. These controls, in certain instances, included moisture sensitive materials which governed the opening and closing of contacts arranged in electric circuits by means of which moisture supplying devices were actuated. In other installations, bi-metallic thermostatic materials were enclosed in fabric envelopes and means for maintaining the latter saturated with water were employed, the control thus produced being affected by both the temperature and humidity of the air engaging it. Other controls include mercury-type thermostats having wicks for conducting water from a pool to the mercury bulb, so that the air passing thereover would reduce the effective temperature in proportion to the quantity of moisture contained in the air.

These prior controls have all been objectionable because they were either not accurate enough or required an undue amount of attention to keep them in proper operating condition.

One of the main objects of this invention resides in the provision of a wet bulb control which will possess all the advantages of the previous controls and the further advantage of requiring a minimum amount of attention.

Another object resides in providing a wet bulb control which will be sensitive and accurate without necessitating the use of a wick or similar moisture conducting members which require frequent replacement.

A further object rests in providing a control device having a chamber for the reception of a liquid and power operated means for causing a flow of air from the enclosure being serviced through or over the liquid and around a mercury-type thermostat, vapor from the liquid being deposited on the bulb of the thermostat to maintain it in a constantly wet condition.

A still further object rests in providing a control device with a thermostatic switch having a predetermined operating point and means for creating abnormal atmospheric conditions in the immediate vicinity of the switch which will vary the operating point and thus produce a variable wet bulb control.

Another object resides in providing a humidity control unit having a container in which a predetermined liquid level is maintained and a thermostat is arranged in close relationship to the pool in order that air forced into engagement with the liquid in the pool will flow around the thermostat and deposit moisture thereon, means being provided to change the temperature of the liquid in order to vary the rate of evaporation thereof. Through such means the thermostat may be made to control the operation of air conditioning apparatus at desired wet and dry bulb temperatures independently of the temperature of the air within the enclosure being serviced.

Other objects will be apparent from the following description and the accompanying drawing in which the invention has been diagrammatically illustrated.

In the drawing:

Fig. 1 is a vertical sectional view taken through a control device formed in accordance with the present invention and showing its position in an electrical circuit, this circuit being shown diagrammatically;

Fig. 2 is a detail horizontal sectional view taken on the plane indicated by the line II—II of Fig. 1;

Referring more particularly to the drawing, the numeral 1 designates a wet bulb control unit in its entirety. In the form shown in Fig. 1, there is provided a container 2 having a chamber 3 formed therein, the bottom of this chamber being closed by a wall 4 removably secured to the lower end of the container 2. The upper end of the container is provided with a laterally extending branch 5, the outer portion of which communicates with the inlet of a motor driven suction fan 6. The top wall of the container has an opening in registration with the axial center of the container for the reception of a mercury-type thermostat 7 having a fixed operating temperature.

The thermostat is supported in a threaded sleeve 8 secured in the opening in the top wall of the container. The upper portion of the thermostat has a pair of spaced contacts 9, one of which is connected by a lead 10 with a source of current. The second contact is connected by a similar lead 11 with the field coil 12 of a relay switch 13, the opposite side of the coil being connected by a wire 14 with the current source to complete the field coil circuit. While the mercury remains at a predetermined elevation in the thermostat tube, the contacts 9 will be connected and current will flow through the circuit to energize the field coil of the relay and hold the switch bar 15 thereof in spaced relation from a pair of contacts 16 which are disposed in a circuit 17 containing the operating coil 18 of a magnetically operated valve 19.

The valve 19 is positioned in a steam line 20 by means of which steam is introduced into the enclosure to be air conditioned. This steam provides the moisture used in humidifying the air within the enclosure. As long as the bar 15 is spaced from the contacts 16, the valve 19 will remain closed and no steam will be admitted. Whenever the mercury in the thermostat tube drops below the predetermined point and current flow between contacts 9 is discontinued, the coil 12 will be deenergized and spring 21 will draw the bar 15 into engagement with the contacts 16 to complete the circuit 17. The coil 18 will be energized, opening the valve 19 and providing for flow of steam through the line 20 and into the enclosure. The flow of steam will continue until the relative humidity of the air within the enclosure reaches the desired point and the mercury in the tube 7 is elevated to again provide for current flow through the circuit which controls the operation of the relay. Current flow through this circuit will cause the bar 15 to be disengaged from the contacts 16 and valve 11 will then be closed.

To provide for the engagement of the air within the enclosure with the thermostatic tube, the container 2 has a plurality of reduced inlet openings 22 formed therein. These openings extend from a shoulder on the side of the container downwardly and terminate at the lower end of the container within the portion enclosed by the wall 4. Ordinarily, the container 2 is disposed within the enclosure to be air conditioned but it would be possible to conduct air from the enclosure to the container 2 if it were desired to have the control located remotely from the enclosure. The inlets 22 communicate with the enclosure so that when the motor 23 is operated to drive the fan 6, air will be withdrawn from the enclosure and pass into the container through the openings 22. After being discharged from the inlet passages, the air will pass upwardly through the container 2 and around the thermostat to the outlet passage 5 leading to the fan 6. This air will be discharged from the fan into the enclosure.

Instead of providing the thermostat with a wick or other moisture conducting element as is the usual practice, the lower or bulb end of the thermostat is disposed within a pool of water or other liquid 24 in the lower portion of the container. This pool is maintained at a predetermined level by connecting a reservoir 25 therewith by a pipe 26. The water level is determined by the position of a float 27 arranged in the reservoir and connected with a valve 28 in a supply line 29. When the liquid level drops, the float will actuate the valve 28 to provide for the introduction of fluid to restore the liquid to its normal level.

As will be noted from Fig. 2, the openings 22 are spaced circumferentially around the container. These openings are of small size in order that the air entering the container will pass through the liquid in small bubbles to violently agitate the liquid whereby the air will pick up moisture and convey it upwardly in the container. Some of this moisture will be deposited on the thermostatic tube and keep its exterior wet at all times. By reason of the moisture on the tube, the contacting air will evaporate a portion of this moisture and reduce the temperature of the thermostat to the wet bulb temperature of the air within the enclosure. By eliminating the wick or other moisture conducting element, the control unit may be operated for sustained periods without requiring any attention.

It may be found desirable to operate the humidity introducing means at a temperature other than the fixed operating temperature of the thermostat. To cause this artificial operation, the outside of the container 2 is provided with a heating element 30 to which current is supplied by a circuit 31. The degree of heat developed by the coil 30 is controlled by a rheostat 32.

By the addition of heating or cooling means, I can conveniently raise or lower the incoming wet bulb affecting temperatures, thus producing, in effect, false readings.

What is claimed is:

1. In air conditioning apparatus, wet bulb thermostatic control means comprising a container, means for maintaining a predetermined liquid level in said container, a mercury tube thermostat having one end immersed in the liquid in said container, reduced air inlet passages formed in said container, said passages terminating within the container below the liquid level, and means providing for the flow of air drawn from an enclosure to be air conditioned through the passages into the container, said air passing through the liquid in said container in the form of small bubbles.

2. In air conditioning apparatus, wet bulb thermostatic control means comprising a container, means for maintaining a predetermined liquid level in said container, a mercury tube thermostat having one end immersed in the liquid in said container, reduced air inlet passages formed in said container, said passages terminating within the container below the liquid level, and motor driven blower means communicating with said container and providing a forced flow of air from an enclosure to be air conditioned through the passages into the container, said air passing through the liquid in the container in the form of small bubbles.

3. In air conditioning apparatus, wet bulb thermostatic control means comprising a container, means for maintaining a predetermined liquid level in said container, a mercury tube thermostat having one end immersed in the liquid in said container, an outlet passage leading from said container above the liquid level, a plurality of spaced relatively small inlet passages leading into said container, said passages terminating within the container below the liquid level therein, and fan means of the suction type communicating with the outlet passage of said container, the inlet passages of said container being in communication with the region to be air conditioned.

4. In air conditioning apparatus, wet bulb thermostatic control means comprising a container, means for maintaining a predetermined liquid level in said container, a mercury tube thermostat having one end immersed in the liquid in said container, said thermostat having a pair of contacts connected in an electrical circuit, an outlet for said container, a plurality of small inlet passages in said container, said passages communicating at one end with the enclosure to be air conditioned and terminating at the other end within the container below the liquid level, and a suction producing device connected with the outlet for said container, operation of said suction device providing for a flow of air from the enclosure to be air conditioned through the inlet passages in said container and through the body of liquid.

5. In air conditioning apparatus, wet bulb thermostatic control means comprising a container, means for maintaining a predetermined liquid level in said container, a mercury tube thermostat having one end immersed in the liquid in said container, means for passing air drawn from an enclosure to be air conditioned through the liquid, and means for changing the temperature of the liquid.

ROBERT M. CONKLIN.